US012003499B2

(12) United States Patent
Sindell

(10) Patent No.: US 12,003,499 B2
(45) Date of Patent: Jun. 4, 2024

(54) UNIVERSAL, HIERARCHALLY-OUTSOURCED MULTI-PHASED AUTHENTICATION FRAMEWORK WITH A CENTRAL GLOBAL DATABASE

(71) Applicant: Gerald Sindell, Napa, CA (US)

(72) Inventor: Gerald Sindell, Napa, CA (US)

( * ) Notice: Subject to any disclaimer, the term of this patent is extended or adjusted under 35 U.S.C. 154(b) by 0 days.

(21) Appl. No.: 17/535,438

(22) Filed: Nov. 24, 2021

(65) Prior Publication Data
US 2023/0164138 A1 May 25, 2023

(51) Int. Cl.
*H04L 29/00* (2006.01)
*G06F 16/25* (2019.01)
*G06F 21/31* (2013.01)
*H04L 9/40* (2022.01)

(52) U.S. Cl.
CPC ............ *H04L 63/083* (2013.01); *G06F 16/25* (2019.01); *G06F 21/316* (2013.01); *H04L 63/105* (2013.01); *H04L 2463/082* (2013.01)

(58) Field of Classification Search
CPC ................. H04L 63/083; H04L 63/105; H04L 2463/082; G06F 16/25; G06F 21/316
See application file for complete search history.

(56) References Cited

U.S. PATENT DOCUMENTS

| | | | | |
|---|---|---|---|---|
| 7,813,822 B1* | 10/2010 | Hoffberg | ................ | H04N 7/163 381/73.1 |
| 7,865,737 B2* | 1/2011 | Suyama | ............... | G06F 21/6209 713/185 |
| 8,316,237 B1* | 11/2012 | Felsher | ................ | H04L 9/3249 380/282 |
| 8,689,294 B1* | 4/2014 | Thakur | ................... | H04L 63/08 726/16 |
| 10,567,375 B1* | 2/2020 | Mossler | ................ | H04L 63/101 |
| 2002/0183115 A1* | 12/2002 | Takahashi | ............... | A63F 13/48 463/42 |
| 2004/0054885 A1* | 3/2004 | Bartram | ................ | H04L 9/3265 709/204 |
| 2006/0277176 A1* | 12/2006 | Liao | ....................... | G06Q 10/10 707/999.005 |
| 2006/0282660 A1* | 12/2006 | Varghese | ............... | G07F 7/1083 713/155 |
| 2007/0050850 A1* | 3/2007 | Katoh | .................... | H04L 63/105 726/1 |
| 2007/0143829 A1* | 6/2007 | Hinton | ................ | H04L 63/0815 726/8 |
| 2009/0158425 A1* | 6/2009 | Chan | ........................ | G06F 21/60 726/21 |
| 2011/0023112 A1* | 1/2011 | Murai | ...................... | G06F 21/36 726/17 |
| 2012/0203906 A1* | 8/2012 | Jaudon | .................. | H04W 76/20 709/225 |
| 2012/0204235 A1* | 8/2012 | Jaudon | .................... | G06F 21/30 726/4 |

(Continued)

*Primary Examiner* — Don G Zhao
(74) *Attorney, Agent, or Firm* — McCarter & English, LLP

(57) ABSTRACT

An authentication framework wherein a user attempting to sign in or to be authenticated in order to access an electronic system is requested to provide an identify factor that includes an activity, location and/or authentication transaction of the User occurring within a previous time period from the User's current attempt to sign in or to be authenticated.

13 Claims, 1 Drawing Sheet

(56) References Cited

U.S. PATENT DOCUMENTS

| | | | | |
|---|---|---|---|---|
| 2014/0344896 | A1* | 11/2014 | Pak | H04L 63/0861 |
| | | | | 726/4 |
| 2015/0095971 | A1* | 4/2015 | Roffe | H04L 63/08 |
| | | | | 726/1 |
| 2015/0178489 | A1* | 6/2015 | Nakano | G06F 21/35 |
| | | | | 726/19 |
| 2016/0087957 | A1* | 3/2016 | Shah | H04L 63/205 |
| | | | | 726/1 |
| 2017/0041296 | A1* | 2/2017 | Ford | G06F 21/64 |
| 2017/0230351 | A1* | 8/2017 | Hallenborg | H04L 63/08 |
| 2017/0230363 | A1* | 8/2017 | Deutschmann | H04W 12/065 |
| 2017/0257397 | A1* | 9/2017 | Graham | H04L 63/1433 |
| 2017/0352197 | A1* | 12/2017 | Mitsunaga | G06V 10/141 |
| 2018/0191695 | A1* | 7/2018 | Lindemann | H04L 63/0853 |
| 2020/0050751 | A1* | 2/2020 | Woo | G06F 21/46 |
| 2020/0127993 | A1* | 4/2020 | Mossler | H04L 63/1416 |
| 2020/0137081 | A1* | 4/2020 | Goldstein | H04L 63/0823 |
| 2020/0162462 | A1* | 5/2020 | Zayats | G06F 16/2379 |
| 2021/0029491 | A1* | 1/2021 | Monteleone | G07C 1/22 |
| 2021/0306335 | A1* | 9/2021 | Avetisov | H04W 12/069 |
| 2022/0131870 | A1* | 4/2022 | McKinnon | H04L 9/3226 |
| 2022/0191192 | A1* | 6/2022 | Dürr | H04L 63/0846 |

* cited by examiner

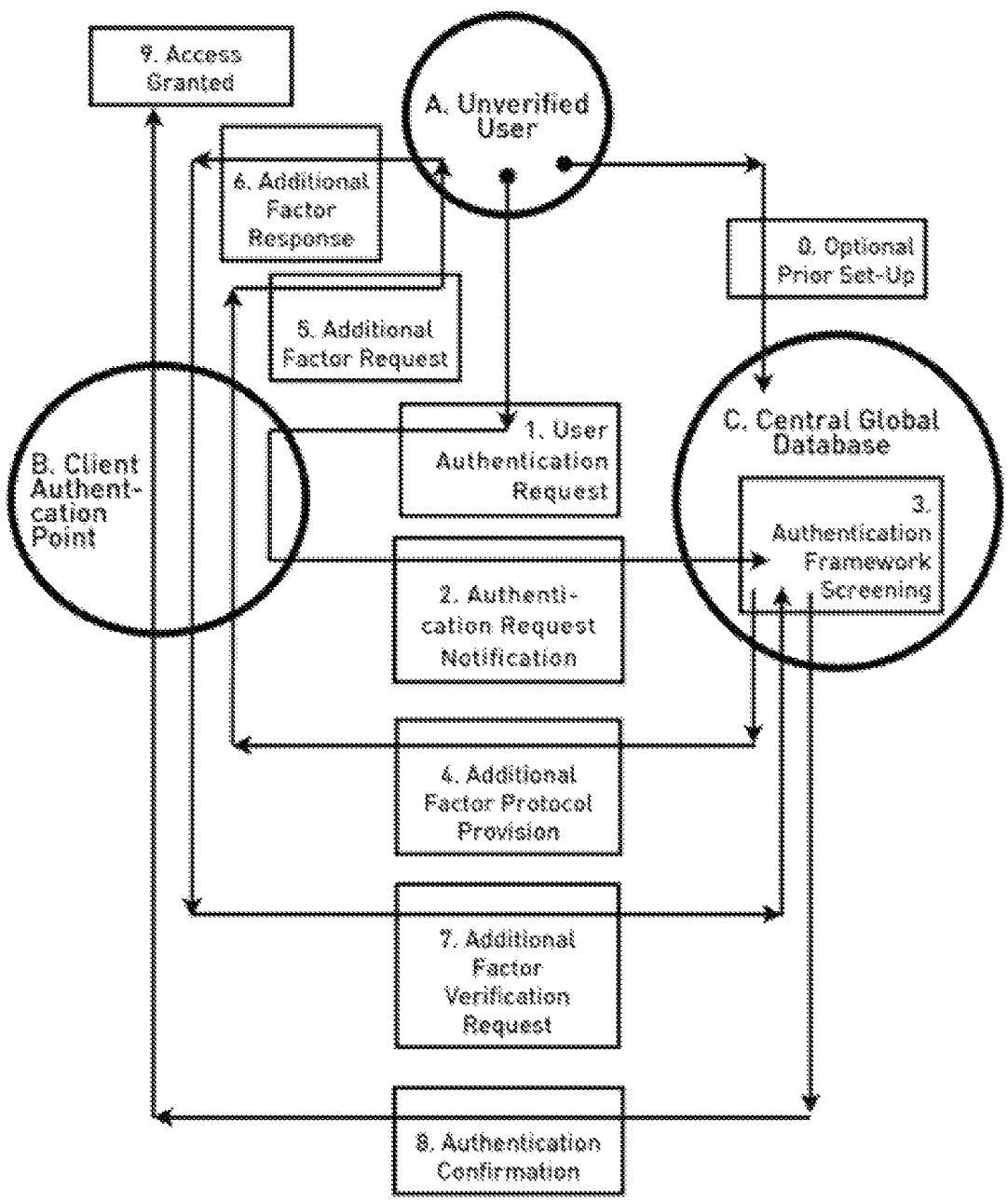

UNIVERSAL, HIERARCHALLY-OUTSOURCED MULTI-PHASED AUTHENTICATION FRAMEWORK WITH A CENTRAL GLOBAL DATABASE

FIELD OF THE INVENTION

This invention relates to security and authentication systems, and will be referred as "The Aligned Trust Framework" or "Aligned Trust".

SUMMARY OF THE INVENTION & DESCRIPTION OF EMBODIMENTS

The disclosure provided in the following pages describes examples of some embodiments of the invention. The designs, FIGURES, and description are non-limiting examples of some embodiments of the invention. Other embodiments of the system may or may not include the features disclosed herein. Moreover, disclosed advantages and benefits may apply to only some embodiments of the invention, and should not be used to limit the scope of the invention.

One embodiment of the invention relates to authenticating users of websites, ATMs, credit card POS terminals, mobile devices, secured personal access systems and to identity cards, such as a passport. In the current authentication space most systems depend upon a password or pin number, a credit card and signature or pin number, or an identification card or paper such as a driver's license or passport.

Each of these systems is vulnerable to identity theft. Users tend to employ the same password everywhere, so that the password is stolen in one location it can be used everywhere. Credit cards can be stolen both physically and electronically. Identity cards and papers can be stolen or forged.

The result of these authentication vulnerabilities is billions of dollars in fraud and the reluctance of a large segment of the world's population unwilling to use the internet for commerce. In addition, lack of security around access to secure areas, in such areas as airports is a constant security threat. In addition, credit card theft is a global plague with losses in the billions of dollars.

Stronger authentication is a pervasive need for commerce, personal security, border security, and privacy.

In one embodiment, a service provides a universal, hierarchically-outsourced multi-phased authentication framework with a central global database. Universal in that the system is intended to serve all potential global users simultaneously; hierarchically-outsourced in that the system offers various levels of authentication in a pre-set sequence that uses both the institution's own internal database as well as the system's central database depending on the preset preferences of both the institution and the individual; multi-phased in that the system has the capacity of using a wide variety of existing and future authentication methodologies; a global central database in that by being capable of tracking a user's patterns constantly and in real-time the system provides a significantly higher level of accuracy than any isolated database would be capable of.

FIG. 1 in attached Appendix forms part of this specification. FIG. 1 is a block diagram of an individual User engaged in the process of attempting to authenticate him or her self.

Referring now to the invention in more detail in FIG. 1, there is shown three key areas identified by their being represented in a circle or oval: A. The User "The Unverified User," B. the authentication service provider "Central Global Database" and C. a Client enterprise "Point of Client Authentication Requirement" which is using the services provided by the Central Global Database.

While the "User" can be any unique individual person, in other embodiments, a user can be any type of entity. In one embodiment, the "Central Global Database" is a universal authentication database gathering user information and providing authentication services throughout the world. In other embodiments, the Central Global Database can exist in multiple locations and multiple partitions.

The "Point of Client Authentication Requirement" is any point of contact where a User needs to demonstrate who they are in order to access and manage information, use debit or credit cards, or manage their finances. A "Client" is any company, organization or entity that subscribes to the authentication services provided by the Central Global Database.

The "Point of Client Authentication Requirement" may be a website, an Automatic Teller Machine, a credit or debit card terminal, a secured door with a coded locking system, a political boundary such as a border crossing station, a law officer's computer in their vehicle, a voting station, and any other location at which one person must be able to authenticate that they are indeed the person whom they represent themselves as being in order to gain access or be accurately recognized.

An "Identity Factor" is any information which increases the level of assurance that a person is who they claim to be. Identity Factors include 1) what someone knows such as a username, password, answer to a secret question, 2) something that someone is physically, such as having a particular fingerprint, location, iris scan, or voiceprint, or 3) something someone possesses, such as a key, token, magnetic card or identification card.

A "Flag" is a data point that indicates a departure in the authentication process from predetermined norms about both the particular User and departure from norms for all users.

Referring to FIG. 1, Before using the process, the User has the option of signing in at the Central Global Database (Step 0) and changing his or her authentication process or data, such as a password or secret question and answer.

Step 1: User Authentication Request

Whether or not the User has previously taken Step 0, the authentication process begins, at Step 1 with the User initiating an Authentication Request. The Request can be in the form of entering an Identity Factor such as a username on a website, the presentation of a debit card at a retail store, or through the presentation of a number of other Identity Factors. Depending on the preference of the Client, the User may enter a secondary Identity Factor such as a password immediately following their entry of their username.

Step 1a: (not Illustrated) Optional Two-Phase Authentication

A website may present its own Identity Factor to the User through the presentation of an image or other previously agreed upon symbol that indicates to the User that they are asking to be authenticated at their intended Authentication Point.

Step 1b.: If a second Identity Factor such as a PIN number is required, and if it has not previously been submitted, the User enters it.

Step 2: Authentication Notification

The Client looks up the username, PIN, and any other Identity Factor offered in the Authentica_tion Request and checks the information against its own database for matches.

Whether or not the information matches the Client's internal database, the Client informs the Central Global Database that the User is attempting to authenticate with this information and forwards the Identity Factor information to the Central Global Database and includes a report of the status of the Identity Factors matches to the Client's internal database.

Step 3: Authentication Exchange Screening

The Central Global Database searches for current knowledge about the User, employing data gathered from the Authentication Request, from a history of previous Authentication Requests from the same User at other Client Authentications Points (including in the previous few hours and days), other metrics including but not limited to the User's IP address, key entry speed, previous habits, User information that the User has previously inputted (in Step 0) and other information which the Central Global Database may have received through subscription to third party resources.

Various proprietary algorithms will dictate whether any serious discrepancies raise "flags" or warnings about the accuracy of Identity Factors and quality of other Authentication information submitted so far.

If there are no flags, the next step is Step 8. On the other hand, if there are flags, the next step is Step 4.

Step 8. Authentication Confirmation (and Data Synchronization)

The Central Global Database transmits an "okay" back to the Client, indicating the Client can grant access to the User.

If there has been a change in password, PIN, or other authentication means which the User has had the option (in Step 0) of changing prior to the Authentication Request, the Central Global Database will inform the Client of the password or other change so that the Client can update their internal database. Similarly, if the Client has received updated sign-in information from the User, that information will update the Central Global Database.

Step 4: Additional Factor Protocol Provision

There are two alternate paths for Step 4, depending on which system has been previously elected by the Client.

Path 1: The Client functions as middleman in the authentication upgrade.

If flags were discovered, the Central Global Database will transmit a Level Increase to the Client with a request to ask the User for an additional Identity Factor. The Central Global Database will transmit the specific request to the Client and when the User responds, the Client will return that response to the Central Global Database.

Alternate Path 2: The Client proxies the Central Global Database to conducts the authentication upgrade directly.

This upgrade may include a number of presently known authentication methods or those yet unknown. Known authentication methods include the transmission of a password or passcode to the User's mobile phone, a voiceprint request, or the answer to a secret question.

Step 5: Additional Factor Request

The Client or the Central Global Database presents the User with an additional Identity Factor in response to the elevated authentication request.

Step 6: Additional Factor Response

The User provides an additional Identity Factor, which is either passed back to the Central Global Database by the Client or goes directly to the Central Global Database, depending on which Path in Step 4 is the previously-agreed upon operating structure.

Step 7: Additional Factor Verification Request

The Client asks for confirmation of authentication, or if the Central Global Database is conducting the Level Increase directly, the Central Global Database makes an authentication decision.

If there are no flags, the next step is Step 8. If there are flags, the system may loop to Step 5.

Step 8. Authentication Confirmation

The Central Global Database confirms the authentication and provides confirmation of authentication to the Client.

Step 9. Access Granted

The Client grants access to User.

The system also has the capacity to include a customized series of requests to the Central Global Database by any individual Client which may be triggered by an unusual item that surfaced during the initial authentication process, such as a great change in distance from a previous login attempt by a user of the same name within a short time period, or a request by a user to transfer an amount of money above a certain preset level.

In Step 0, there a more options for the User to control their centralized identity. User has the opportunity to change or remove their password(s) for all sites, add additional identities, change their secret questions, provide special information regarding forthcoming travel, add token systems, add upgrade levels to various specific transactions such as would be required to initiate a wire transfer. In the instance of suspected identity theft, the User will need to go to only the Central Global Database to quickly change all their passwords and other forms of identification, such as tokens.

In another embodiment, when a user believes his or her identity has been stolen or compromised, the user can access a control panel and "Suspend" all authentication everywhere. The user can then go about re-setting passwords and other tokens.

The central database has the capacity to function as a clearinghouse for authentication information in that the database aggregates information and, at a User's direction, can propagate this information to other Clients.

In the instance where the User changes their password at a Client site, the Central Global Database will be automatically updated of that change for that specific site.

The system is adaptable to conform with the requirements of the Levels 1 through 4 authentications as defined in the National Institute of Standards and Technology Special Publication 800-63 Version 1.0.2 "Electronic Authentication Guideline."

If for some reason the speed of the service slows, the transactions will take place without the system being involved. For example, the legacy authentication process will be left intact. In other words, the system maintains the accuracy of the legacy authentication so that it remains viable if the system is unavailable.

In still another embodiment, the system will be Boolean and become more algorithmic over time.

A New Authentication Factor Based on Previous Authentication Attempts

In yet another embodiment, the system comprises an authentication factor based on other authentication attempts within a recent time period. Increasingly, institutions are relying on 'challenge' authentication factors to defend against illegitimate user access. The current state of the art of challenge questions are of two basic kinds: 1) those drawn from 'secret' questions and answers the user has previously entered into the system, and 2) those drawn from knowledge about the user gained from access to financial records databases, including car payment amounts.

The shortcomings of these factors is that the information they rely upon can be gained by third parties, including unauthorized third parties. Credit history information can be acquired by criminals. The knowledge behind secret challenge questions, such as a mother's maiden name or the name of a first pet, are frequent targets of imposters, and the answers to secret questions, once gained, can be used to access a user's accounts everywhere.

Basically, challenge questions as they exist currently, are very much like passwords. Once hacked or stolen, they become liabilities to the security of the user, as opposed to being security assets.

In one version of the system, the system globally gathers authentication attempts and uses information gained from earlier activity to make judgments about the quality of subsequent authentication attempts in other venues. For example, a sign-in to Facebook at 8:00 AM provides information that can authenticate an attempted use of an ATM at 9:00 AM, with the system comparing location, time of day, user habits, and where else the user has been in the previous few hours.

The system also has the ability to create challenge questions arising out of the user's immediate proximate authentications. These attempts occur throughout the typical person's typical day, from going online first thing in the morning to check one's mail, to dropping in on a social media site, to buying a cup of coffee at the local coffee shop, to driving through an automated toll system (such as EZ pass) to authentication at one's place of work with a card swipe, to signing in to work using one's employee badge, to using a debit card to buy lunch.

In-the-moment challenge questions uses everyday data to create multiple choice challenge questions which can be used when an institution desires a higher level of authentication, often called multi factor authentication. The first factor is username, the second would be password, the third would be a in-the-moment multiple choice question posed to the user (through the sign on screen at a financial institution, the screen on an ATM, or even a challenge question relayed to a smart phone via SMS, or even telephonically.

As an example, the in-the-moment question would ask which of three time periods the user had last passed through a toll bridge, or bought a coffee, or signed in to work, or accessed Facebook.

Among the novelty of these time-dependent contextual challenge questions is that they are valid only for a few hours, so their value, if overheard or intercepted, is minimal.

Since the challenge questions are based on activity as opposed to knowledge stored in the system, the system reduces the need to collect and retain personal user data.

Also, the possibility of an imposter having knowledge of these question or answers is extremely low, requiring that the imposter track every movement and activity of the user for an indeterminate period of time.

Additionally, an imposter would need to be in close proximity to the legitimate user at the moment of fraudulent attempt, since the system tracks the hourly path of authentication attempts of the legitimate user.

Global Universal User Unique Identity

In still another embodiment of the invention, the system utilizes an eternal global universal user identifier. Currently, many countries assign an identification number to each of their citizens for the life of that citizen. These numbers function as identification, as passport numbers, as national health numbers, as retirement account numbers, and more. The size and format of these numbers, however, vary by country or region.

For large global organizations trying to serve their customers, this completely non-standard way of identifying individuals creates errors, misidentifications, confusions, and the opportunity for imposters to create false identities.

Thus, it would be desirable if each person on earth could have their own unique global identifier, for commercial, security, convenience, identity protection and for the benefit of statistical analysis both now and far into the future.

In one version of the system, the system creates a unique, eternal, identity for each person on the planet. Unique—in that each identifier, comprises a combination of blanks, numbers and letters, would be that person's identifier forever and no two individuals will ever share the same number, now or into distant centuries in the future.

Eternal—unlike the current US Social Service practice which re-uses a Social Security number ten years after an individual has become deceased—the identifier would remain with an individual in perpetuity.

The Global Unique Identity will be assigned by the system as new individuals are identified and enrolled. Enrollment may take in a number of ways: 1) a financial or other services institution that has passed reliability standards becomes a client of the authentication service. At that moment, all of the institution's customers become enrolled the Global Unique Identity database. 2) A governmental institution may choose to enroll their entire citizenry in the database, and if that government passes reliability standards, those citizens may be enrolled. 3) Individuals may apply individually for enrollment at an in-person enrollment facility, or a designated authorized enrollment facility and present documentation which can be accepted for enrollment.

The Global Universal User Unique Identity will be in the form of a seven or eight character 'word' comprised of 1) blanks, 2) Arabic numbers, i.e. 0 though 9 and 3) the Latin alphabet, i.e. the letters A through Z.

As a benefit of this unique identifier, the system will be able to reduce authentication fraud or errors by gathering a database of the recent locations of an individual, their travels and their authentication habits. Although the system may not learn the contents of an individual's transactions, and although the system purges much of its data about an individual over time such as within a 36-48 hour period, the system does create models of the individual in order to protect that individual against authentication fraud and identity theft.

Vanity Versions of Global Universal Identities

In a further embodiment of the system, the system creates a vanity version of the eternal global universal user identification. Every person who is enrolled in the system and is assigned a Global Universal Identity can be assigned a 'word' that is unique to them, comprised of blanks, numbers and letters.

It would be beneficial if individuals had the option of purchasing a 'vanity' identification alias on an annual or lifetime renewal basis. The vanity identifications may be as short as a single letter or number, or as long as a user's first initial and last name. The size of the alias can be adjusted to account for system needs.

Except for those few users who will be able to purchase one or two digit number-only aliases, users will typically purchase an alias that relates to their legal name, so that no one will be able to reserve someone else's initials without that also being closely related to the purchaser's legal name. This is intended to prevent the development of a secondary market in which first adopters purchase large numbers of aliases and then sell them at higher prices.

A benefit of the alias is that those who purchase one will have the ability to identify themselves easily and uniquely anywhere on Earth, simply offering their alias. The authentication system will confirm their identity, connecting the alias to the correct related Global Unique Identity.

Duplicative Identifiers

In yet another embodiment of the system, the system identifies duplicate occurrences of third-party identifiers such as device identifiers, user names, credit card numbers and social security numbers. When the system identifies such duplications, the system can trigger a fraud alarm. This is different from authentication in real-time (which we do only at the moment of an authentication attempt). This detection would be constant—looking at the system's entire database and yielding possible imposters who have been successfully accessing another user's account.

Authenticating a Mobile Device as if it were a Person

In the current environment there is considerable pressure coming from both consumer and business forces to have mobile devices be able to be used as reliable authentication proxies. People want their mobile device to be a secure proxy so they can use them to identify themselves, to make payments, to access secure information (such as their bank accounts). The challenge is that is the current state of authentication is profoundly flawed, having come to a limit imposed by an unwillingness of consumers to accept requests to increase the complexity of their passwords and change them more frequently. Aligned Trust has described this limit as an "Authentication Wall"—that point at which the quality of authentication can only increase by means other than making increased demands on consumers.

So the notion that it would be desirable for authentication to be delegated, or proxied, to a mobile device creates another area of authentication vulnerability on top of an already fragile authentication environment.

A key aspect of making mobile devices secure is that they must be as reliably identified as their owners. For mobile device authentication to work, there also needs to be a reliable way to link the device to the individual. For a single institution trying to validate both the user and the device, the problem can be insurmountable. It is difficult enough for a merchant or a financial institution to detect an imposter customer—and it is even more difficult to detect a stolen or imposter mobile device.

The Aligned Trust service make it possible for mobile devices to be a secure part of the authentication chain by treating mobile devices the same way Aligned Trust gets to the accurate identity of a human individual: by real-time tracking of previous authentication attempts and gathering a fabric of the user's pattern.

By gathering all information about a device's attempts to be used as a proxy, and by comparing that information to the user's authentications with and without the device, Aligned Trust can provide a high level of security for mobile device authentication attempts.

Aligned Trust provides an improved authentication service by gathering a wide spectrum of information from outside the customary process. Current authentication is generally binary: a person wants to identify themselves for the purpose of gaining access. Access is either granted or denied based on the evidence provided by the applicant. We characterize this current architecture as inherently a "fortress" approach. To improve it one can build higher or thicker walls, make the doors narrower, and just continue to make it harder to get in.

The Aligned Trust architecture is a breakthrough to an "outside the fortress walls" architecture. With Aligned Trust in place, information gathered from a broad window of time and activities creates a full real-time 3600 view of the applicant. When that knowledge is brought to bear on the authentication attempt we are moving from the peephole of the fortress to the high-definition of real knowledge of the applicant—to identity itself.

Aligned Trust does not replace the institution's existing authentication infrastructure—it enhances it.

Aligned Trust also provides an auxiliary mechanism for users to manage multiple log-ins, passwords, and other authentication factors in a central location.

Aligned Trust creates unique, highly-customized in-the-moment challenge questions that obviate the need for other secondary authentication factors.

A feature of one embodiment of the Aligned Trust authentication service is that it creates a Global Unique Identifier for every adult on earth who needs to authenticate themselves (think debit cards, social media, driver's license.) Having a unique identifier for everyone is a basic part of being able to protect the identity of each person and to be able to provide reliable authentication.

It might seem, at first thought, that every mobile device has one or more unique identifiers. After all, they have serial numbers, IMIE, ICCID, MEID numbers. But because each of these numbers is either generated by the manufacturer or the carrier, they can be duplicated or hacked. And it is beyond the scope of any manufacturer to be able to track the identity of a device when ownership changes, or a different carrier is selected.

When Aligned Trust creates an identity for each mobile device, that identity stays with the device regardless of change in ownership or carrier. The identity of the device is retired only with the end of the device's service life.

Matching Up Individuals and Devices

The first time a user uses a new mobile device to authenticate themselves, Aligned Trust will create a link between the user and their device. Whenever the device is used for authentication from that point forward, Aligned Trust will ascertain, at the moment of attempt, whether the user and the device are aligned in time, place, habit, recent authentications, and other Aligned Trust proprietary rules. If there is a discrepancy, the user will be asked challenge questions that Aligned Trust derives from user activities in the previous few hours to assure authentication accuracy. If a device has been stolen, or if the device's internal identifiers have been hacked and their use is being attempted by an imposter, Aligned Trust will deny authentication.

Control Panel

The Aligned Trust service provides access for every user to a single point web-based control panel of their identity. Among the many features is a page that shows the user the various mobile devices that are currently associated with the user. The user may change the status of their devices to one of the following states: A—active, B—transferred, C—no longer in use, and D—lost or stolen.

The control panel will show showing which apps access what information, and allow the user to change those settings.

Physical Security of the Device Issues

If the device is stolen or hacked, Aligned Trust will instantly stop the device from being used for authentication of any kind.

Aligning Human and Mobile Device Identity

Aligned Trust keeps the identity of the user and of various mobile devices in alignment, and detects when they no longer are, protecting the user from the instant their device is stolen or its identifier cracked or duplicated.

CONCLUSION

Example implementations of the systems and methods described above are included in the attached Appendices, which forms a part of this specification.

The various illustrative logical blocks, modules, and processes described herein may be implemented as electronic hardware, computer software, or combinations of both. To clearly illustrate this interchangeability of hardware and software, various illustrative components, blocks, modules, and states have been described above generally in terms of their functionality. However, while the various modules are illustrated separately, they may share some or all of the same underlying logic or code. Certain of the logical blocks, modules, and processes described herein may instead be implemented monolithically.

The various illustrative logical blocks, modules, and processes described herein may be implemented or performed by a machine, such as a computer, a processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor may be a microprocessor, a controller, microcontroller, state machine, combinations of the same, or the like. A processor may also be implemented as a combination of computing devices, e.g., a combination of a DSP and a microprocessor, a plurality of microprocessors or processor cores, one or more graphics or stream processors, one or more microprocessors in conjunction with a DSP, or any other such configuration.

The blocks or states of the processes described herein may be embodied directly in hardware, in a software module executed by a processor, or in a combination of the two. For example, each of the processes described above may also be embodied in, and fully automated by, software modules executed by one or more machines such as computers or computer processors. A module may reside in a computer-readable storage medium such as RAM memory, flash memory, ROM memory, EPROM memory, EEPROM memory, registers, hard disk, a removable disk, a CD-ROM, memory capable of storing firmware, or any other form of computer-readable storage medium known in the art. An exemplary computer-readable storage medium can be coupled to a processor such that the processor can read information from, and write information to, the computer-readable storage medium. In the alternative, the computer-readable storage medium may be integral to the processor. The processor and the computer-readable storage medium may reside in an ASIC.

Depending on the embodiment, certain acts, events, or functions of any of the processes or algorithms described herein can be performed in a different sequence, may be added, merged, or left out all together. Thus, in certain embodiments, not all described acts or events are necessary for the practice of the processes. Moreover, in certain embodiments, acts or events may be performed concurrently, e.g., through multi-threaded processing, interrupt processing, or via multiple processors or processor cores, rather than sequentially.

Conditional language used herein, such as, among others, "can," "could," "might," "may," "e.g.," and from the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the logical blocks, modules, and processes illustrated may be made without departing from the spirit of the disclosure. As will be recognized, certain embodiments of the inventions described herein may be embodied within a form that does not provide all of the features and benefits set forth herein, as some features may be used or practiced separately from others.

The invention claimed is:

1. An authentication framework comprising steps of:
   (a) a Client making an authentication request to a User currently attempting to sign in or to be authenticated by the Client via a Point of Client Authentication Requirement in order to access an electronic system;
   (b) the Client receiving a first Identity Factor from the User;
   (c) when a second Identity Factor is required by the Client for the User to sign in or be authenticated by the Client, the Client receiving a second Identity Factor from the User;
   (d) the Client determining whether the first Identity Factor and the second Identity Factor, when received by the Client, match corresponding information in a Client database;
   (e) the Client informing a Central Global Database, wherein the Central Global Database includes a database, that the User is attempting to sign in or to be authenticated by the Client, forwarding the first Identity Factor and the second Identity Factor when received by the Client to the Central Global Database, and reporting said determination made during step (d);
   (f) the Central Global Database searching for current knowledge about the User, including
      employing data gathered from the User's current attempt to sign in or to be authenticated by the Client,
      employing data from a history of previous attempts by the User to sign in or otherwise to be authenticated by the Client via other Points of Client Authentication Requirement,
      other metrics including an IP address from which the User is currently attempting to sign in or be authenticated,
      past and/or present key entry speed of the User,
      previous habits of the User,
      information that the User has previously inputted to the Central Global Database, and/or
      other information which the Central Global Database received through subscription to third party resources;
   (g) the Central Global Database determining whether any Flags exist with respect to the User's current attempt to sign in or to be authenticated by the Client;
   (h) when no Flags exist, next performing steps (l) through (m);
   (i) asking the User to provide an additional Identity Factor, wherein (1) when the Client uses a first additional factor protocol, the Central Global Database transmits to the Client a request to ask the User for said additional Identity Factor, the Client asks the User for said additional Identity Factor, and when the User responds to the Client's request, the Client returns said response of the User to the Central Global Database; and (2) when the Client uses a second additional factor protocol, the Client proxies the Central Global Database to ask the User for said additional Identity Factor;

wherein the additional Identity Factor includes an activity, location and/or authentication transaction of the User occurring within a day of the User's current attempt to sign in or to be authenticated by the Client;

(j) after receiving the additional Identity Factor, the Central Global Database evaluates the authentication of the User;

(k) when one or more Flags exist regarding said authentication of the User, returning to step (i) to request a further additional Identity Factor from the User;

(l) the Central Global Database providing confirmation of authentication of the User to the Client;

(m) the Client granting the User access to said electronic system; and (n) when the Central Global Database or the Client received a changed first Identity Factor, a changed second Identity Factor and/or a changed additional Identity Factor from the User prior to the User's current attempt to sign in or to be authenticated by the Client, the Central Global Database or the Client providing said changed first Identity Factor, said changed second Identity Factor and/or said changed additional Identity Factor to the other of the Central Global Database or the Client, and the Central Global Database or the Client receiving said changed first Identity Factor, said changed second Identity Factor and/or said changed additional Identity Factor updating the respective database of the Central Global Database or the Client with said changed first Identity Factor, said changed second Identity Factor and/or said changed additional Identity Factor.

2. The authentication framework according to claim 1, wherein, prior to step (a), the User accesses the Central Global Database and changes the User's first Identity Factor and/or second Identity Factor.

3. The authentication framework according to claim 2, wherein the second Identity Factor comprises a Personal Identification Number, a password, or a secret question and answer.

4. The authentication framework according to claim 1, wherein the second Identity Factor comprises a Personal Identification Number, a password, or a secret question and answer.

5. The authentication framework according to claim 1, wherein said history includes previous attempts by the User within a pre-defined previous number of hours or within a pre-defined previous number of days.

6. The authentication framework according to claim 1, wherein the additional Identity Factor includes a password or passcode transmitted to a mobile phone of the user, a voiceprint request, or an answer to a secret question.

7. The authentication framework according to claim 1, wherein the additional Identity Factor includes a previous authentication transaction.

8. The authentication framework according to claim 7, wherein the previous authentication transaction includes a previous sign in by or authentication of the User.

9. The authentication framework according to claim 7, wherein the previous authentication transaction includes a previous attempt by the user to sign in by or to be authenticated.

10. The authentication framework according to claim 1, wherein the step of asking the User to provide an additional Identity Factor includes presenting a question to the User.

11. The authentication framework according to claim 10, including, prior to the step of presenting a question to the user, the step of creating said question.

12. The authentication framework according to claim 10, wherein the question comprises a multiple-choice question.

13. The authentication framework according to claim 1, wherein the additional Identity Factor comprises an activity of the user, wherein the activity includes a purchase and/or payment of the User.

* * * * *